United States Patent
Takahashi

(10) Patent No.: US 6,850,281 B2
(45) Date of Patent: Feb. 1, 2005

(54) FOCAL-PLANE SHUTTER FOR DIGITAL STILL CAMERAS

(75) Inventor: Shigemi Takahashi, Nerima-ku (JP)

(73) Assignee: Nidec Copal Corporation, Tokyo (JP)

( * ) Notice: Subject to any disclaimer, the term of this patent is extended or adjusted under 35 U.S.C. 154(b) by 869 days.

(21) Appl. No.: 09/772,904

(22) Filed: Jan. 31, 2001

(65) Prior Publication Data

US 2001/0010560 A1 Aug. 2, 2001

(30) Foreign Application Priority Data

Feb. 1, 2000 (JP) ........................................ 2000-028935

(51) Int. Cl.[7] .............................................. H04N 5/238
(52) U.S. Cl. ...................................... 348/363; 396/487
(58) Field of Search ................................ 348/362, 363, 348/367, 375; 396/487, 489, 449, 470

(56) References Cited

U.S. PATENT DOCUMENTS

| | | | | |
|---|---|---|---|---|
| 4,737,808 A | * | 4/1988 | Toyoda | 396/489 |
| 5,875,368 A | * | 2/1999 | Hasuda et al. | 396/484 |
| 5,997,188 A | * | 12/1999 | Takahashi et al. | 396/487 |

FOREIGN PATENT DOCUMENTS

| | | |
|---|---|---|
| JP | 55149924 | 11/1980 |
| JP | 62018525 | 1/1987 |
| JP | 10096975 | 4/1998 |
| JP | 11326992 | 11/1999 |

* cited by examiner

*Primary Examiner*—Tuan Ho
*Assistant Examiner*—Yogesh Aggarwal
(74) *Attorney, Agent, or Firm*—Pillsbury Winthrop LLP

(57) ABSTRACT

A focal-plane shutter for digital still cameras is constructed so that a first driving member for a first blade connected to the first blade is biased by a cocking spring to rotate clockwise and a second driving member for the first blade is biased by a driving spring to rotate counterclockwise. A driving member for a second blade connected to the second blade is biased by a driving spring to rotate counterclockwise. An exposure aperture is fully opened before photographing, and when a cocking member is rotated in a clockwise direction in photographing, the first driving member is released from the holding of the cocking member and is rotated, and the exposure aperture is covered by the first blade. After that, when releasing members are separated from the iron cores of respective electromagnets, locks of locking members are released, and the driving members are rotated counterclockwise in turn. Consequently, exposure is carried out through a slit formed by the first blade and the second blade.

8 Claims, 10 Drawing Sheets

FOCAL-PLANE SHUTTER FOR DIGITAL STILL CAMERAS

BACKGROUND OF THE INVENTION

1. Field of the Invention

This invention relates to a focal-plane shutter for digital still cameras which is designed to actuate a first blade and a second blade in turn in the same direction when photographing is performed and to expose an imaging surface through a slit provided by both blades.

2. Description of Related Art

In focal-plane shutters used in digital still cameras, some types of shutters are known in accordance with the specifications of cameras. One of them, like a focal-plane shutter used in a film camera, is equipped with a first blade and a second blade to actuate these blades in turn at predetermined timing so that an imaging surface is exposed continuously from its one side to the other through a slit provided by the blades.

Digital still cameras using shutters constructed as mentioned above are divided into two classes, those in which an optical finder is provided as in the film camera so that the imaging surface is covered by at least one of the first blade and the second blade, except for the case where photography is performed, and those, having finders referred to as electronic view finders, in which the entire surface in an exposure aperture is exposed to light from an object so that an image of the object can be observed through a monitor, except for the case where photographing is performed. Thus, the latter camera is such that, in photography, the first blade is moved to the position where it covers the imaging surface, and then an exposure operation is performed.

In the film camera, the area of the imaging surface is usually larger than that of the digital still camera. The film camera always has the optical finder. Due to the arrangement of an optical system and the placement of a film, each of the first blade and the second blade is composed of a plurality of blade components to achieve compactness of a shutter unit. However, in the digital still camera, particularly provided with the electronic view finder, each of the first blade and the second blade need not necessarily be constructed with a plurality of blade components. An example of a shutter constructed from such a viewpoint is shown in FIG. 1 (refer to Japanese Patent Preliminary Publication No. Hei 11-326992).

Focal-plane shutters are of two types. They are called a direct type and a locking type in accordance with the difference between systems for holding a first-blade driving member and a second-blade driving member at an exposure operation starting position. The direct type shutter is designed so that each of the driving members is attracted and held directly at the exposure operation starting position by an electromagnet energized after the release of a camera, and the exposure operation is performed immediately when the electric conduction of the electromagnet of each driving member is interrupted in turn. Therefore, in this type, after a cocking operation, a cocking member cannot be restored immediately to an initial position before cock, and after the electromagnet is energized prior to subsequent photography, the cocking member is restored. The shutter shown in FIG. 1 is constructed as such a direct type shutter.

On the other hand, the locking type shutter is such that each driving member is mechanically held at the exposure operation starting position by a corresponding locking member, and when the conduction of the electromagnet of each driving member is interrupted, a release member separated from the electromagnet releases a locking state of the driving member to perform the exposure operation. Hence, in the shutter of this type, the cocking member may be restored to the initial position immediately after the cocking operation, or it may be restored prior to photography, as in the direct type shutter, in association with the release of the camera.

Since the focal-plane shutter for digital still cameras mentioned above, in contrast with that for film cameras, is not subjected to severe restriction of space, each of the first blade and the second blade, as described above, can be constructed with a single blade component. However, if the entire shutter unit is enlarged, the number of degrees of camera design freedom will be limited in inverse proportion to shutter size, and the possibility of using this shutter unit will diminish. Thus, apart from the number of blade components of each of the first blade and the second blade, at least, compactness of the entire shutter unit is the maximum requirement, together with cost reduction thereof.

When the conventional example shown in FIG. 1 is considered from such a standpoint, the shutter is constructed so that the vertical dimension of a base plate 101 must be substantially increased. Specifically, in FIG. 1, a second blade 105 is located at a higher position than a first blade 102, and when the exposure operation is performed, the second blade 105 passes the place of the first blade 102 and then blocks an optical path AP. Thus, the conventional example, in contrast with an ordinary shutter, unnecessarily provides a space for the second blade 105 and must increase the vertical dimension of the base plate 101 accordingly.

In order to solve this problem, it is conceivable that, in FIG. 1, the second blade 105 is located at the same position as the first blade 102 so that after the first blade 102 completely blocks the optical path AP and then starts to open it, the actuation of the second blade 105 is begun. In this case, however, a large difference arises between time required for the first blade 102 from the start of blade actuation to the start of opening of the optical path AP and time required for the second blade 105 from the start of blade actuation to the start of closing of the optical path AP. Consequently, it is extremely difficult to provide a proper slit for making proper exposure.

Specifically, as is well known, the first blade 102 and the second blade 105 are actuated by their respective driving springs. It is, of course, desirable that these driving springs are identical parts. In the above construction, however, the first blade 102 and the second blade 105 have a large difference in time between the start of blade actuation and the start of crossing of the optical path AP by the edge of the slit. Thus, there is a considerable difference between both in biasing force of the driving spring exerted when the edge of the slit crosses the path. Consequently, a large difference arises between the blades 102 and 105 in speed (operation characteristic) where the optical path AP is crossed, and it is impossible to maintain a proper slit from start to finish in the exposure operation. Although the use of driving springs with different specifications is considered, it is very difficult that the shutter is designed to across the optical path AP at the same speed (operation characteristic).

In the conventional example mentioned above, even though each of the first blade 102 and the second blade 105 is constructed with a plurality of blade components, it is impossible to obtain further compactness of the shutter unit. Specifically, for example, if the first blade 102 and the second blade 105 are constructed with respective two blade components and are arranged as in FIG. 1 in a state where the respective two blade components are completely superimposed, the upper dimension of the optical path AP will be approximately halved. In this case, however, the two blade components of the first blade, after blocking the optical path AP in a state where the amount of mutual superposition is minimized, are moved downward by the same amount as in this state, and thus the dimension below the optical path AP is required twice. As a result, the upper and lower dimensions of the entire shutter unit cannot be reduced.

SUMMARY OF THE INVENTION

It is, therefore, an object of the present invention to provide a focal-plane shutter for digital still cameras which allows an imaging surface to be exposed through a slit provided by the first blade and the second blade and which is favorably applied to a camera equipped with an electronic view finder and is suitable for compact design.

In order to achieve the above object, the focal-plane shutter for digital still cameras of the present invention includes a shutter base plate provided with an exposure aperture; a first blade and a second blade for opening and closing the exposure aperture, each having a plurality of arms pivotally mounted on the shutter base plate and at least one blade component pivotally supported thereby; a first driving member for the first blade, connected to the first blade and actuated so that the first blade closes the exposure aperture with the biasing force of a cocking spring immediately before the exposure operation is started; a second driving member for the first blade, actuated by the biasing force of a driving spring for the first blade when the exposure operation is performed, and moving the first driving member for the first blade so that the first blade opens the exposure aperture against the biasing force of the cocking spring; a retaining means for the first blade, retaining the second driving member for the first blade at the position where the exposure operation is started and releasing the retention of the second driving member for the first blade when the exposure operation is performed; a driving member for the second blade, connected to the second blade and moving the second blade so that the exposure aperture is closed by the biasing force of a driving spring for the second blade when the exposure operation is performed; a retaining means for the second blade, retaining the driving member for the second blade at the position where the exposure operation is started and releasing the retention of the driving member for the second blade when the exposure operation is performed; and a cocking member, moving the second driving member for the first blade and the driving member for the second blade against the biasing forces of respective driving springs when moved from the initial position to the cocked position and preventing the biasing force of the cocking spring from moving the first driving member for the first blade to put the exposure aperture to a fully opened state so that when the first driving member for the first blade is restored to the initial position from the cocked position at the initial stage of subsequent photography, the first driving member for the first blade can be actuated by the biasing force of the cocking spring.

The focal-plane shutter for digital still cameras of the present invention is such that the retaining means for the first blade includes a locking member for the first blade for locking the second driving member for the first blade at the position where the exposure operation is started and a releasing member for the first blade, having an electromagnet for the first blade and an iron piece member for the first blade attracted by the electromagnet for the first blade and releasing the lock of the second driving member for the first blade by the locking member for the first blade when the attraction of the electromagnet for the first blade is released. Whereby, the system of the first blade can be constructed as a favorable locking type.

In this case, the shutter can be designed so that when the cocking member is actuated from the initial position to the cocked position, the locking member for the first blade temporarily locks the first driving member for the first blade until a state where the actuation of the first driving member for the first blade can be prevented, and the lock of the first driving member for the first blade is released in association with the subsequent actuation of the cocking member. By doing so, the arrangement of individual members is facilitated.

The focal-plane shutter for digital still cameras of the present invention is such that the retaining means for the second blade includes a locking member for the second blade for locking the driving member for the second blade at the position where the exposure operation is started and a releasing member for the second blade, having an electromagnet for the second blade and an iron piece member for the second blade attracted by the electromagnet for the second blade and releasing the lock of the driving member for the second blade by the locking member for the second blade when the attraction of the electromagnet for the second blade is released. Whereby, the system of the second blade can be constructed as a favorable locking type.

The focal-plane shutter for digital still cameras of the present invention can be constructed so that the retaining means for the first blade includes an electromagnet for the first blade and an iron piece member attached to the second driving member for the first blade, and the retaining means for the second blade includes an electromagnet for the second blade and an iron piece member for the second blade attached to the driving member for the second blade. Whereby, a preferred construction of the direct type shutter can be obtained.

In this case, the shutter can be designed so that when the cocking member is actuated from the initial position to the cocked position, a locking member temporarily locking the first driving member for the first blade is provided until a state where the actuation of the first driving member for the first blade can be prevented, and the lock of the first driving member for the first blade is released in association with the subsequent actuation of the cocking member. By doing so, the arrangement of individual members is facilitated.

The focal-plane shutter for digital still cameras of the present invention can be also constructed so that when the cocking member is restored to the initial position from the cocked position in a state where the conduction of the electromagnet for the first blade and the electromagnet for the second blade is interrupted, only the second blade is actuated to close the exposure aperture, with the first blade held at the position where the exposure aperture is opened, and then when the cocking member is actuated from the initial position to the cocked position, the second blade is actuated to open the exposure aperture and, together with the first blade, opens the exposure aperture. Whereby, when the cocking member is restored to the initial position, the exposure aperture is covered with the second blade and thus the imaging surface, for example, of a CCD, is favorably protected.

This and other objects as well as the features and advantages of the present invention will become apparent from the

DETAILED DESCRIPTION OF THE PREFERRED EMBODIMENT

The present invention is applicable to the focal-plane shutter of either the direct type or the locking type and is such that each of the first blade and the second blade can be constructed with a single blade component or a plurality of blade components. The embodiment is the focal-plane shutter of the locking type, in which each of the first blade and the second blade is constructed with a plurality of blade components. The structure of the embodiment is first described below, chiefly using FIGS. 2 and 3. In the following description, the object side of individual members is conveniently referred to as a surface side, and an image sensor (such as a CCD) side as a back side.

Figure 1:
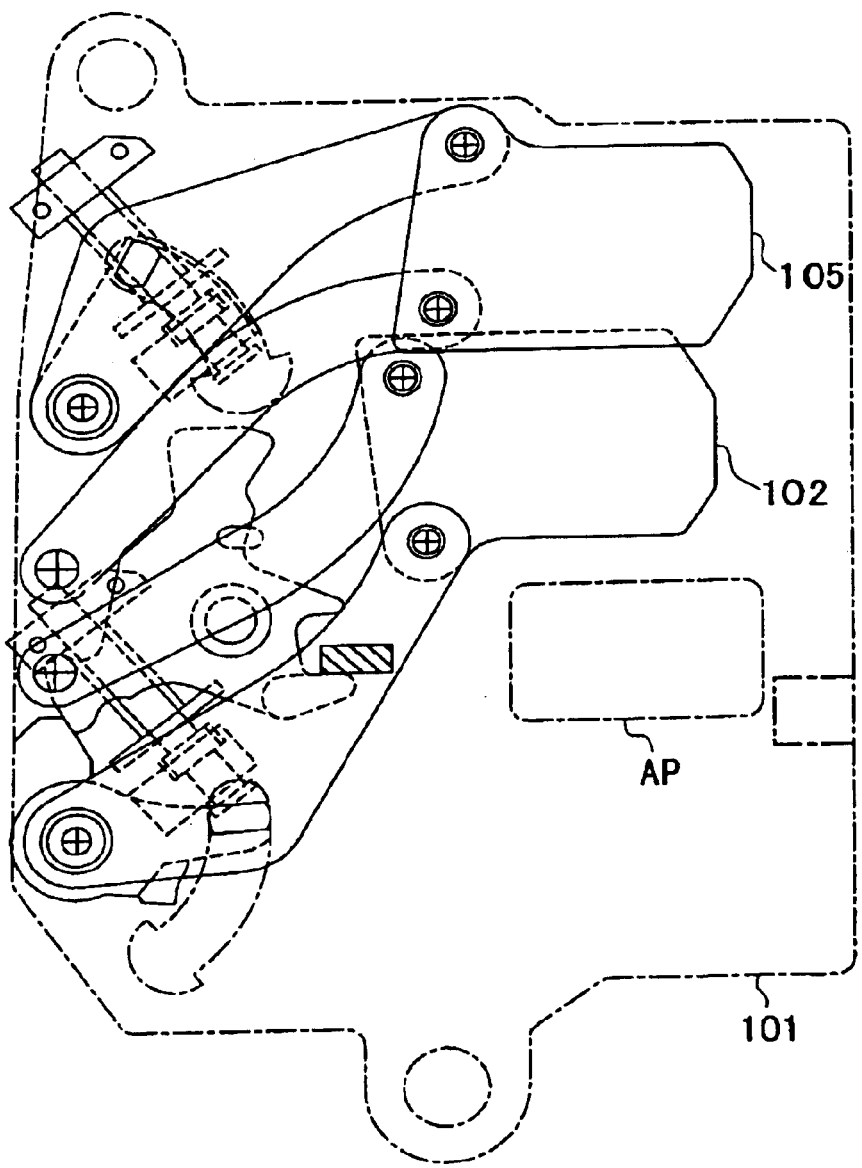
FIG. 1 is a plan view showing a conventional example of a shutter for digital still cameras.
Figure 2:
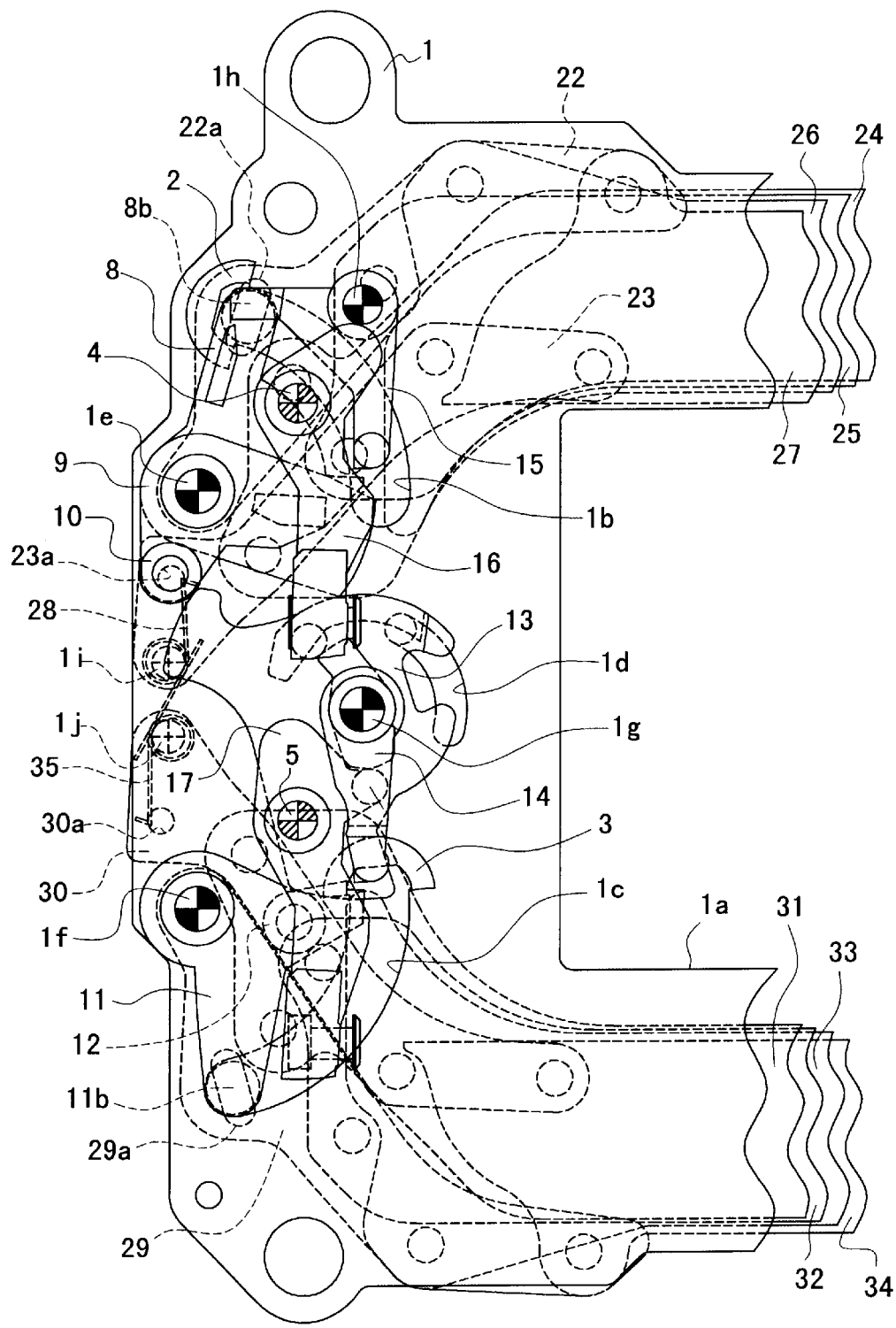
FIG. 2 is a plan view showing parts on the left side of a shutter of one embodiment in the present invention, viewed from the object side, that is, the photographic lens side, in a cocked state, that is, a state where an exposure aperture is fully opened.

As shown in FIG. 2, a shutter base plate 1 is provided with an aperture 1a of a rectangle elongated in a lateral direction at about the middle thereof. Since, as mentioned above, FIG. 2 depicts parts of the shutter on the left side thereof, viewed from the object side, the aperture 1a is also depicted as a part thereof on the left side. An intermediate plate and an auxiliary base plate, although not shown here, are placed, a predetermined distance apart, on the back side of the shutter base plate 1. A blade chamber for the first blades is provided between the shutter base plate 1 and the intermediate plate, and a blade chamber for the second blades is provided between the intermediate plate and the auxiliary base plate. In the intermediate plate and the auxiliary base plate, apertures similar to the aperture 1a are also provided, and usually these three apertures are superposed to restrict the exposure aperture as a photographing image frame. The embodiment is described on the premise that the configuration of the aperture 1a restricts the exposure aperture.

Three arcuate slots 1b, 1c, and 1d are provided on the left side of the aperture 1a. At the upper ends of the slots 1b and 1c, shock absorbing members 2 and 3 made of butyl rubber, each having a planar shape of the letter C, are mounted in a well-known fashion. Shafts 1e, 1f, 1g, and 1h are provided on the surface side of the shutter base plate 1, and shafts 1i and 1j are provided on the back side. The shafts 1e and 1f project on the back side and serve also as shafts provided on the back side. At the tops of the shafts 1e, 1f, and 1g provided on the surface side, a supporting plate, not shown, is mounted to be parallel to the shutter base plate 1, and shafts 4 and 5 are provided toward the shutter base plate 1 from the supporting plate. An electromagnet for the first blade and an electromagnet for the second blade are attached to the supporting plate on the side of the shutter base plate 1, and only corresponding iron cores 6 and 7 are indicated by chain lines in FIG. 3.

On the surface side of the shutter base plate 1, a first driving member 8 for the first blade and a second driving member 9 for the first blade, each made of synthetic resin, are mounted to the shaft 1e to be independently rotatable. The first driving member 8 for the first blade has an engaging portion 8a on the surface side and a driving pin 8b on the back side, and is provided with a portion 8c to be held on the periphery so that it is biased by a cocking spring described later to rotate indirectly in a clockwise direction. The driving pin 8b has a circular cross section at its root edge and an oval cross section at its top so that the root edge is capable of abutting on the shock absorbing member 2, and the top passes through the slot 1b to project remarkably on the back side of the shutter base plate 1. The second driving member 9 for the first blade, on the other hand, has an engaging portion 9a and a roller 10 rotatably mounted to a shaft 9b provided on the surface side, and is provided with a pressing portion 9c for pressing the engaging portion 8a on the back side so that it is biased by a stiff driving spring for the first blade, not shown, to rotate counterclockwise.

On the surface side of the shutter base plate 1, a driving member 11 for the second blade, made of synthetic resin, is rotatably mounted to the shaft 1f and is biased by a stiff driving spring for the second blade, not shown, to rotate counterclockwise. The driving member 11 for the second blade has an engaging portion 11a and is provided with a driving pin 11b on the back side. The driving pin 11b has the same shape as the driving pin 8b so that its root edge is capable of abutting on the shock absorbing member 3, and its top passes through the slot 1c to project remarkably on the back side of the shutter base plate 1. A roller 12 is rotatably mounted to the shaft 1c provided on the back side of the driving member 11 for the second blade.

A cocking member 13 made of synthetic resin and a locking member 14 are rotatably mounted to the shaft 1g of the shutter base plate 1 and are biased by independent springs, not shown, to turn clockwise. The cocking member 13 has two pressing portions 13a and 13b and a portion 13c to be pressed on the periphery and two pressing portions 13d and 13e on the surface side. On the back side, the cocking member 13 also has a holding portion 13f coming in contact with the portion 8c to be held of the first driving member 8 for the first blade and a pin 13g fitted into the slot 1d of the shutter base plate 1. On the other hand, the locking member 14 has a locking portion 14a locking the engaging portion 11a of the driving member 11 for the second blade and a portion 14b to be pressed.

A locking member 15 made of synthetic resin is rotatably mounted to the shaft 1h of the shutter base plate 1 and is biased by a spring, not shown, to turn clockwise. The locking member 15 has two arms, one having a locking portion 15a for locking the engaging portion 9a of the second driving member 9 for the first blade and a portion 15b to be pressed, and the other having a locking portion 15c for locking the engaging portion 8a of the first driving member 8 for the first blade.

A releasing member 16 for the first blade and a releasing member 17 for the second blade are rotatably mounted to the two shafts 4 and 5, respectively, provided on the above-mentioned supporting plate, not shown, and are biased by springs, not shown, to rotate counterclockwise. These releasing members 16 and 17, made of synthetic resin, have pressing portions 16a and 17a for pressing the portions 15b and 14b to be pressed of the locking members 15 and 14 on their respective peripheries, mounting portions 16b and 17b on the surface side, and portions 16c and 17c to be pressed, pressed by the pressing portions 13d and 13e of the cocking member 13 on the back side.

Figure 8:
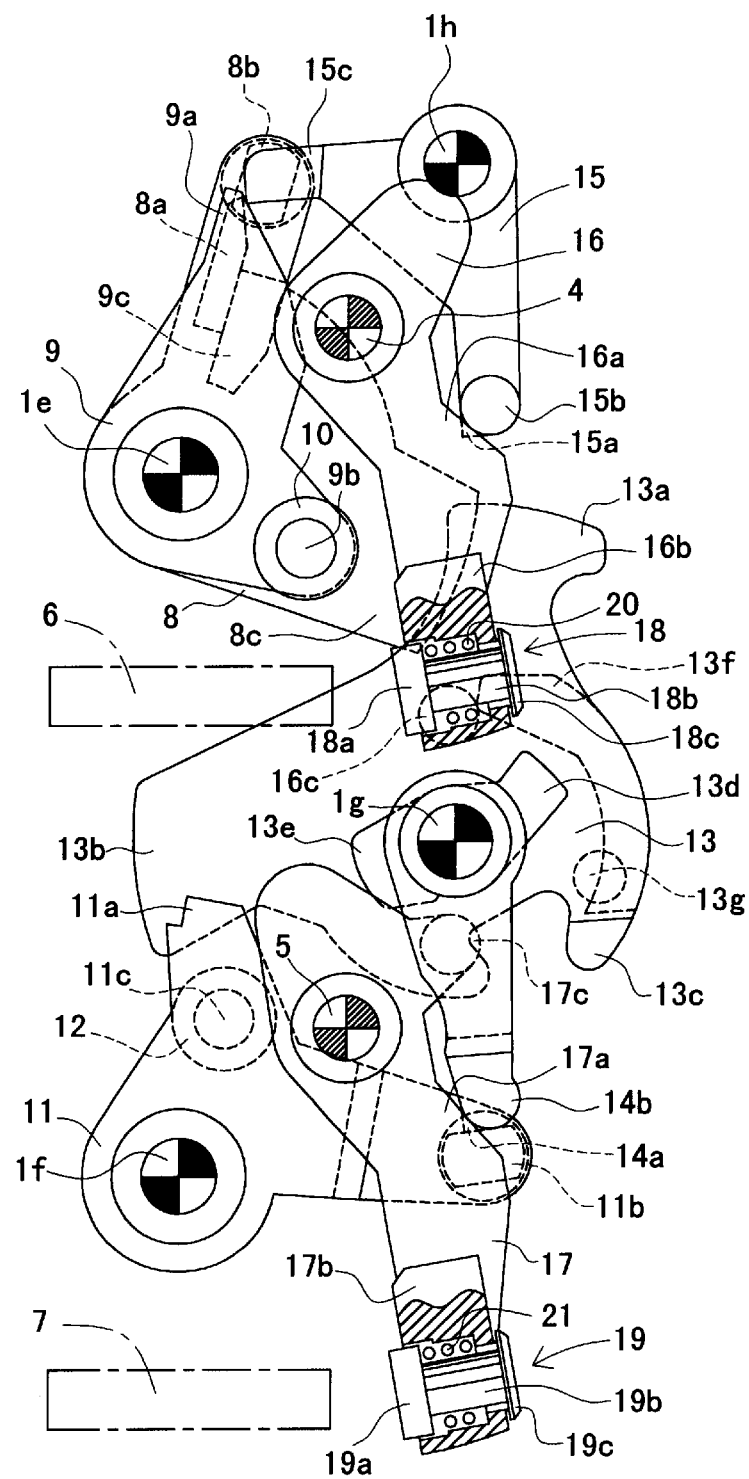
FIG. 8 is a plan view showing essential parts of the opening and closing drive mechanism of the embodiment in a state where the exposure operation of the second blades is also completed after a state of FIG. 7.

The mounting portions 16b and 17b are provided with iron piece members 18 and 19, respectively, and the structures of these members are described in reference to FIG. 8 showing the mounting portions 16b and 17b which are partially broken. The iron piece members 18 and 19 include iron piece portions 18a and 19a attracted to the iron cores 6 and 7 of the individual electromagnets, shaft portions 18b and 19b, and head portions 18c and 19c, respectively, and are mounted so that they can be moved along axial directions of the shaft portions 18b and 19b, respectively. In FIG. 8, the iron piece portions 18a and 19a are biased by compression springs 20 and 21, respectively, so as to protrude from the mounting portions 16b and 17b, but this is prevented by the fact that the head portions 18c and 19c come in contact with the mounting portions 16b and 17b, respectively.

Subsequently, a description is given of members mounted on the back side of the shutter base plate 1 in reference to FIG. 2. The first blade group is placed in the blade chamber provided by the shutter base plate 1 and the intermediate plate, not shown, and is constructed with two arms 22 and 23 rotatably mounted to the shafts 1e and 1i, respectively, of the shutter base plate 1 and four blades 24, 25, 26, and 27, pivotally mounted in turn lengthwise of the arms. The blade 27 pivotally mounted at a foremost place serves to form a slit. The structure of each of the blades pivotally mounted, as will be well known, is such that connecting shafts of rivet parts are inserted in holes provided in the arms and the blades from the arm side and the ends of the shafts are riveted and fixed to the blades. Hence, the first blade group is constructed so that the heads of the connecting shafts protrude from the two arms 22 and 23 on the side of the shutter base plate 1.

The one arm 22 of the first blade group is provided with a slot 22a, into which the top end of the driving pin 8b of the first driving member 8 for the first blade is fitted. The other arm 23 is provided with a hole 23a, in which one end of a cocking spring 28 is hooked. Specifically, the cocking spring 28 is put on the shaft 1i of the shutter base plate 1 so that its one end is hooked in the hole 23a and the other is hooked on the shaft 1j of the shutter base plate 1, and thereby the arm 23 is biased to rotate clockwise. A way of hooking the spring with respect to the arm 23 as mentioned above has been known from the past. Although a conventional spring has been used only to adjust the clearance of each of pivotal portions, the cocking spring of the embodiment, as seen from the explanation which will be made later, has the purpose of moving the first blade group and the first driving member 8 for the first blade to the position of the exposure operation start, in addition to this adjustment. Therefore, its biasing force is set to be greater than in the conventional adjustment of clearance.

The second blade group, which is exactly the same in structure as the first blade group, is placed between the intermediate plate and the auxiliary base plate which are not shown, in a state where the first blade group is reversed. The second blade group includes two arms 29 and 30 rotatably mounted to the shafts 1f and 1j, respectively, of the shutter base plate 1 and four blades 31, 32, 33, and 34, pivotally mounted in turn lengthwise of the arms. The blade 34 pivotally mounted at a foremost place serves to form a slit. A driving pin 11b of a driving member 11 for the second blade is fitted into a slot 29a of the arm 29. A spring 35 is mounted to the shaft 1j of the shutter base plate 1 so that its one end is hooked in a hole 30a of the arm 30 and the other is hooked on the shaft 1i of the shutter base plate 1, and thereby the arm 30 is biased to rotate clockwise. Since the spring 35 is used only for the adjustment of clearance of the pivotal portion, its biasing force is, of course, weaker than that of the driving spring for the second blade and in addition, considerably weaker than that of the cocking spring 28.

Figure 3:
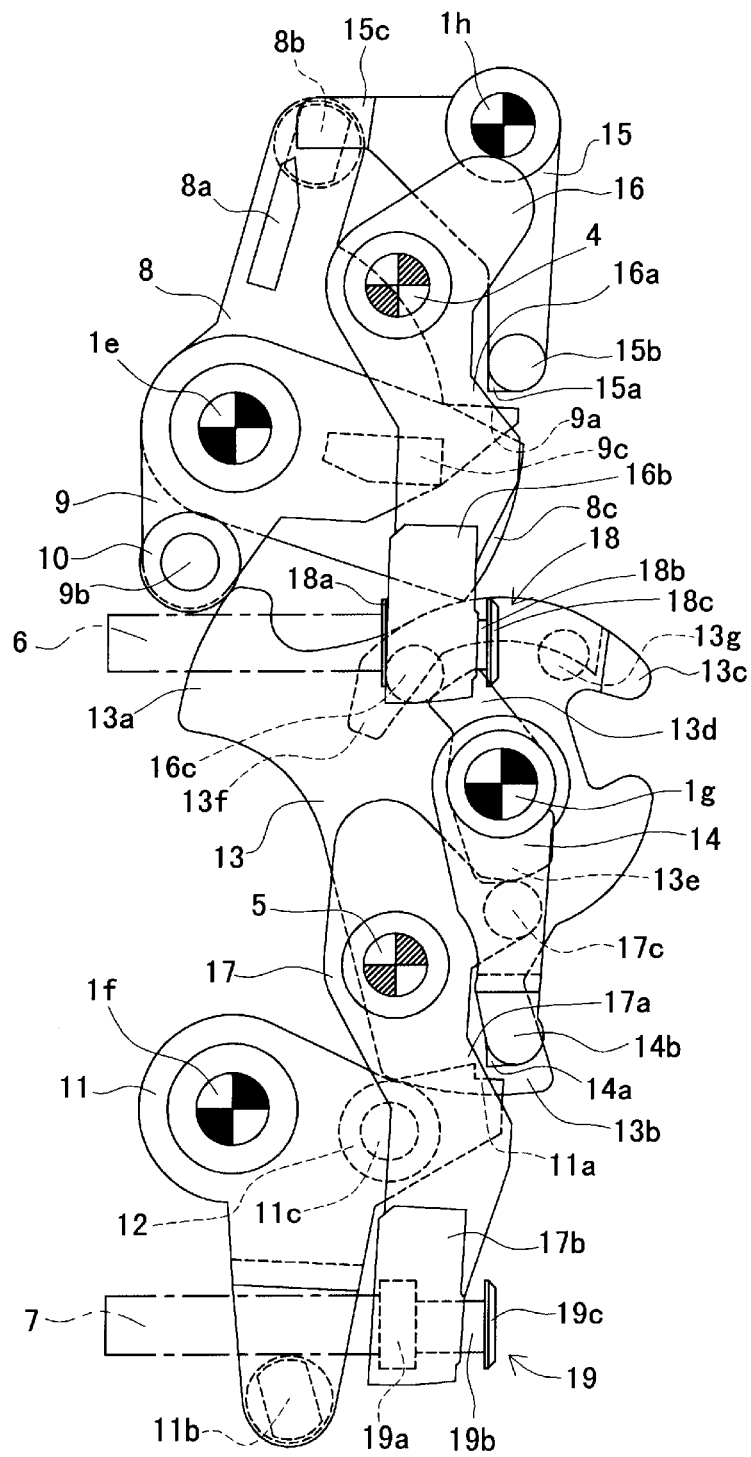
FIG. 3 is a plan view showing essential parts of an opening and closing drive mechanism of the embodiment in a state of FIG. 2.

Subsequently, the operation of the embodiment will be described in reference to FIGS. 2–10. Each of FIGS. 2 and 3 depicts a cocked state of the shutter, which is indicated by reference symbol A in FIG. 10. Specifically, the cocking member 13 is such that the portion 13c to be pressed is pressed by a member, not shown, on the camera body side, and after being rotated in a counterclockwise direction against the biasing force of a spring, not shown, the cocked position is maintained by stopping the member on the camera body side. Consequently, the second driving member 9 for the first blade and the driving member 11 for the second blade maintain a state where the rollers 10 and 12 are pressed by the pressing portions 13a and 13b, respectively, of the cocking member 13 and thereby the members 9 and 11 are turned in a clockwise direction against the biasing forces of a driving spring for the first blade and a driving spring for the second blade, respectively, not shown.

Since the cocking spring 28 provides a biasing force tending to rotate the arm 23 in a clockwise direction, the force is transferred to the driving pin 8b through the four blades 24–27 and the arm 22, and the first driving member 8 for the first blade is biased to rotate clockwise. The portion 8c to be held is held by the holding portion 13f of the cocking member 13 and thereby the above state is maintained. Hence, in this cocked state, the four blades 24–27 of the first blade group are superposed and stored at the upper place of the aperture 1a, while the four blades 31–34 of the second blade group are superposed and stored at the lower place of the aperture 1a. In this way, the aperture 1a brings about a fully opened state. As such, in the cocked state, the image sensor is exposed over the entire area within the image frame, and thus it becomes possible to observe an image of an object through a monitor.

Furthermore, in the cocked state, the releasing member 16 for the first blade and the releasing member 17 for the second blade maintain a state where the portions 16c and 17c to be pressed are pressed by the pressing portions 13d and 13e, respectively, of the cocking member 13 and thereby the members 16 and 17 are rotated in a clockwise direction against the biasing forces of respective springs, not shown. Thus, the iron piece members 18 and 19 are such that the iron piece portions 18a and 19a come in contact with the iron cores 6 and 7, respectively, of the electromagnets, and the compression springs 20 and 21 (see FIG. 8) are compressed and are somewhat pushed into the mounting portions 16b and 17b to separate the heads 18c and 19c from the mounting portions 16b and 17b, respectively. In this case, the locking members 14 and 15 are biased by springs, not shown, to rotate clockwise, but this state is maintained by stoppers, not shown.

In the cocked state mentioned above, when the release button of the camera is pushed, coils, not shown, wound around the iron cores 6 and 7 of the electromagnets for the first blade and for the second blade are first energized. The iron piece members 18 and 19 coming in contact with the iron cores 6 and 7, respectively, are thus attracted and retained by electromagnetic forces. After that, since the member, not shown, on the camera body side is retired from the portion 13c to be pressed of the cocking member 13, the cocking member 13 is also retired by a spring, not shown, and is rotated in a clockwise direction. A state where the pressing portion 13a of the cocking member 13 is just ready to separate from the roller 10 of the second driving member 9 for the first blade is illustrated in FIG. 4.

Figure 4:
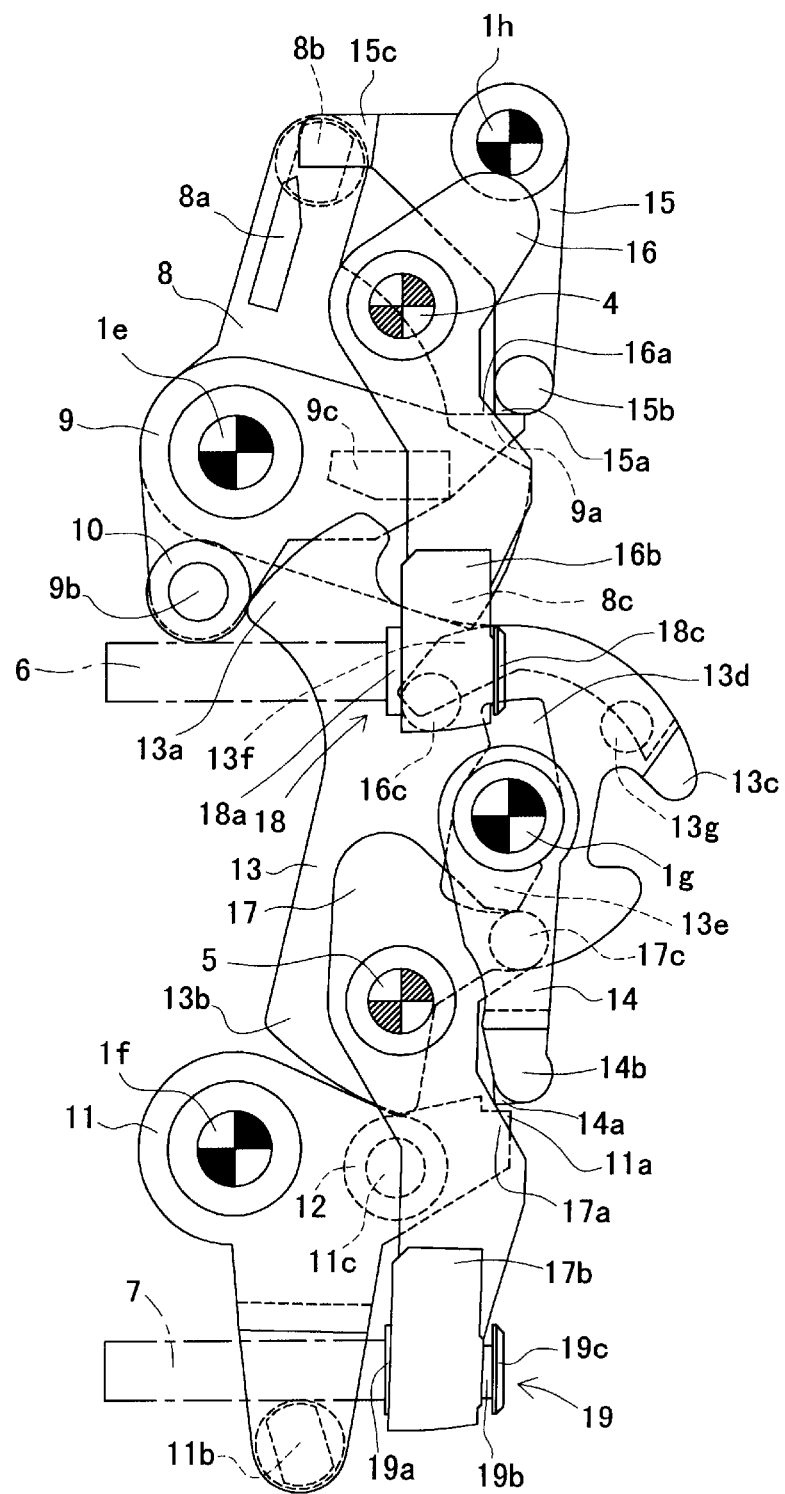
FIG. 4 is a plan view showing essential parts of the opening and closing drive mechanism of the embodiment in a state immediately before first blades begin to move toward an exposure operation starting position after a camera is released.

In FIG. 4, the first driving member 8 for the first blade is in the same state as the cocked state because the portion 8c to be held is still held by the holding portion 13f of the cocking member 13. The second driving member 9 for the first blade, however, is somewhat rotated in a counterclockwise direction by the biasing force of the driving spring for the first blade, not shown, and the engaging portion 9a is locked by the locking portion 15a of the locking member 15. Because the pressing portion 13d of the cocking member 13 is separated from the portion 16c to be pressed, the releasing member 16 for the first blade is somewhat rotated in a counterclockwise direction by the biasing force of a spring, not shown, and is stopped when the mounting portion 16b abuts on the head 18c of the iron piece member 18.

The position of contact between the roller 12 and the pressing portion 13b of the cocking member 13 is shifted, and thereby the driving member 11 for the second blade is somewhat rotated in a counterclockwise direction by the biasing force of the driving spring for the second blade, not shown. However, the engaging portion 11a is not locked yet by the locking portion 14a of the locking member 14. In this state, the arm 29 of the second blade group is somewhat rotated, from a state of FIG. 3, by the driving pin 11b, but the slit forming blade 34 does not reach yet the aperture 1a. Moreover, the position of contact between the portion 17c to be pressed and the pressing portion 13e of the cocking member 13 is shifted, and thereby the releasing member 17 for the second blade is somewhat rotated in a counterclockwise direction by the biasing force of a spring, not shown. However, the mounting portion 17b does not abut yet on the head 19c of the iron piece member 19.

Figure 5:
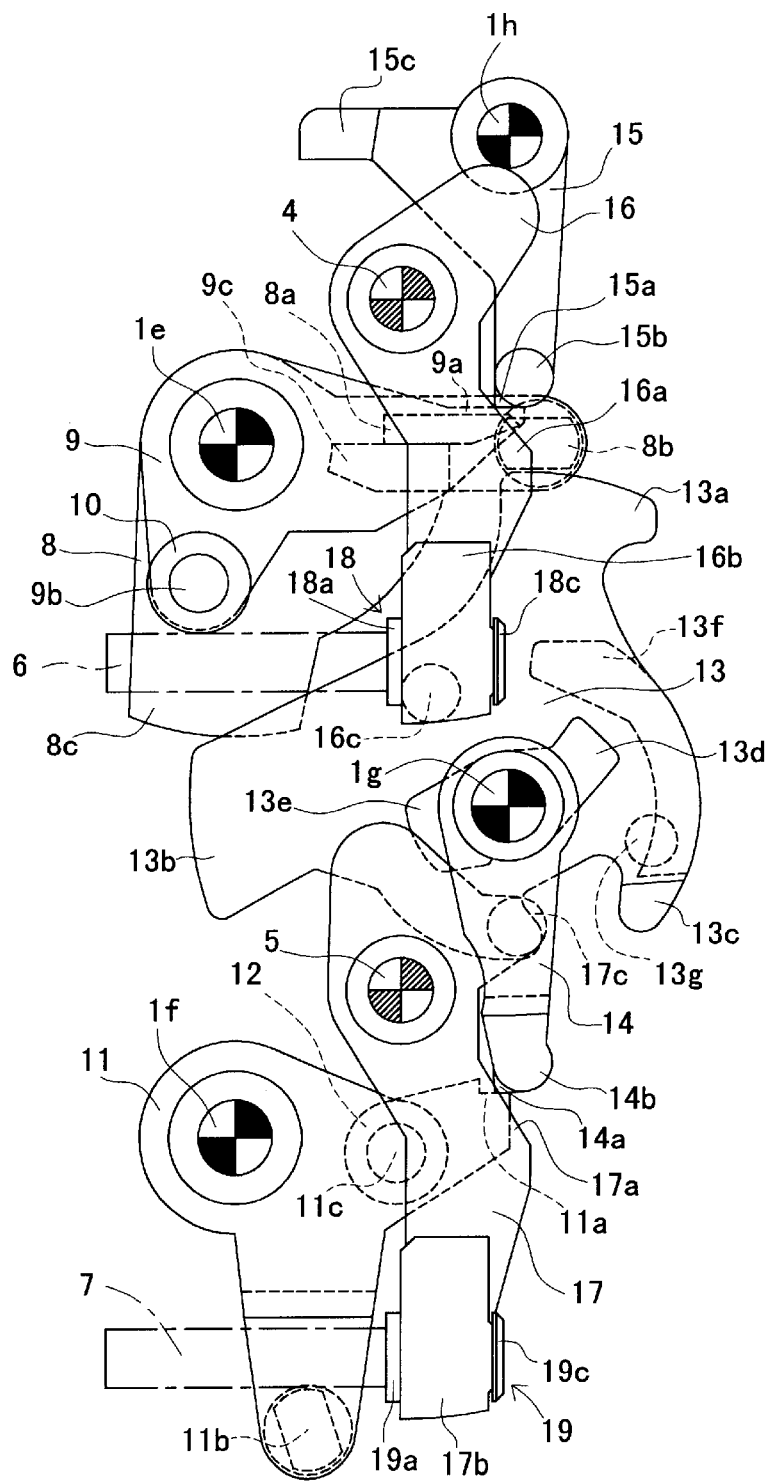
FIG. 5 is a plan view showing essential parts of the opening and closing drive mechanism of the embodiment in a state where the first blades and second blades are at the exposure operation starting position.
Figure 6:
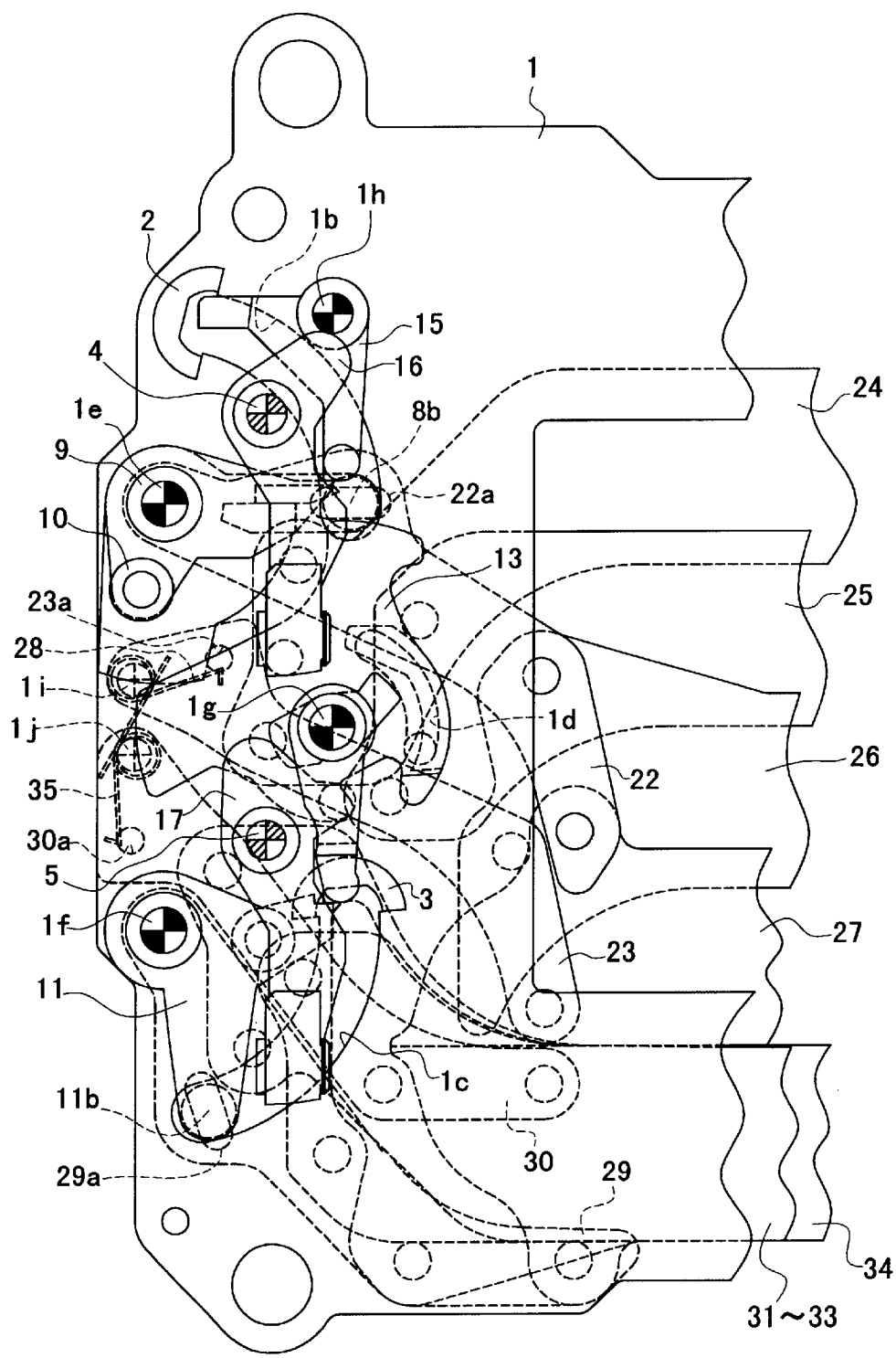
FIG. 6 is a plan view showing a state of FIG. 5 as in FIG. 2.

A state where the cocking member 13 is further rotated in a clockwise direction from a state of FIG. 4 and the pin 13g abuts on the lower edge of the slot 1d and is stopped is shown in FIGS. 5 and 6. For the cocking member 13, such a state is the initial position. In this state, since the holding portion 13f of the cocking member 13 has already released the holding of the holding portion 8c of the first driving member 8 for the first blade, the first driving member 8 for the first blade is rotated in a clockwise direction by the biasing force of the cocking spring 28 hooked on the arm 23 and is stopped when the engaging portion 8a abuts on the pressing portion 9c of the second driving member 9 for the first blade. Consequently, the four blades 24–27 of the first blade group are moved downward and as shown in FIG. 6, cover the aperture 1a in a spread state.

In a process from a state of FIG. 4 to that of FIG. 5, since the pressing portion 13b of the cocking member 13 is completely separated from the roller 12, the driving member 11 for the second blade is further rotated in a counterclockwise direction by the biasing force of the driving spring for the second blade, not shown, and is stopped when the engaging portion 11a is locked by the locking portion 14a of the locking member 14. Therefore, the arm 29 for the second blade group is further rotated in a counterclockwise direction than in a state of FIG. 4. However, this rotation is slight, and thus the four blades 31–34 of the second blade group, as shown in FIG. 6, does not reach yet the aperture 1a.

Moreover, in a process from a state of FIG. 4 to that of FIG. 5, since the pressing portion 13e of the cocking member 13 is separated from the portion 17c to be pressed of the releasing member 17 for the second blade, the releasing member 17 for the second blade is further rotated in a counterclockwise direction by the biasing force of the spring, not shown, and is stopped when the mounting portion 17b abuts on the head 19c of the iron piece member 19. A state of each of FIGS. 5 and 6 brought about in this way provides the exposure operation starting position for the driving members 8, 9, and 11 and for the blade groups as well. When this state is reached, a control circuit is switched automatically from an observation mode to a photographing mode.

When a state of each of FIGS. 5 and 6 is obtained in this way and is switched over to the photographing mode, the conduction of the coil of the electromagnet for the first blade, not shown, is first interrupted and at the same time, the count of electrical time (time electrically calculated to obtain proper exposure time) in an exposure time control circuit is started. Consequently, the retaining force of the iron piece member 18 caused by the iron core 6 of the electromagnet for the first blade is lost, and the releasing member 16 for the first blade is rotated in a counterclockwise direction by the biasing force of the spring, not shown. The portion 15b to be pressed is pressed by the pressing portion 16a so that the locking member 15 is rotated in a counterclockwise direction until it is stopped by a stopper, not shown, against the biasing force of the spring, not shown. Since, in this case, the locking portion 15a of the locking member 15 is disengaged from the engaging portion 9a of the second driving member 9 for the first blade, the second driving member 9 for the first blade is rotated in a counterclockwise direction by the biasing force of the stiff driving spring for the first blade, not shown. The pressing portion 9c presses the engaging portion 8a of the first driving member 8 for the first blade to rotate the first driving member 8 for the first blade in a counterclockwise direction against the biasing force of the cocking spring 28.

Figure 7:
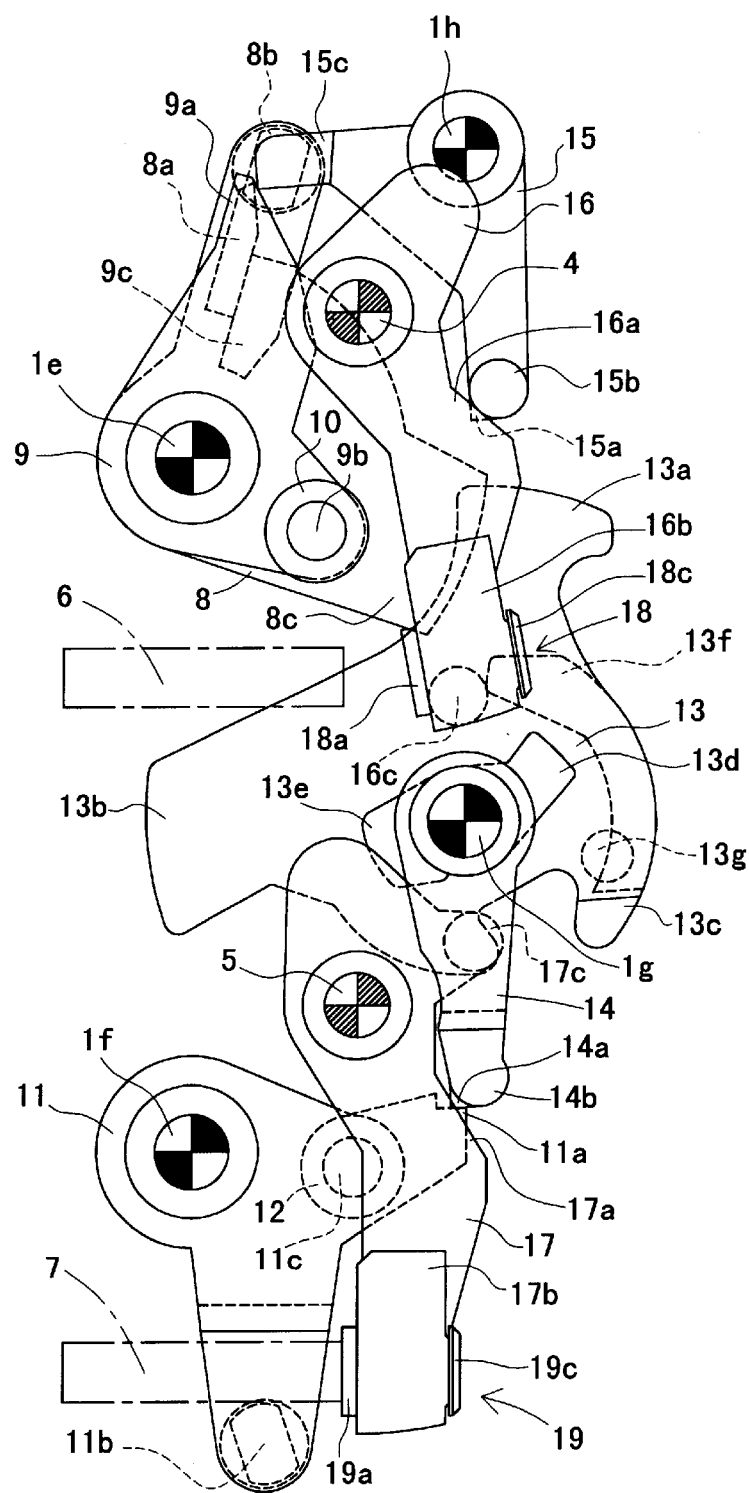
FIG. 7 is a plan view showing essential parts of the opening and closing drive mechanism of the embodiment in a state where the exposure operation of the first blades is completed, but that of the second blades is not started.

As such, the arm 22 is rotated in a counterclockwise direction by the driving pin 8b of the first driving member 8 for the first blade, from a state of FIG. 6, so that the four blades 24–27 of the first blade group are moved upward. By doing so, the amount of superposition of adjacent blades 24–27 is increased, and the aperture 1a is opened by a slit forming edge which is the lower edge of the slit forming blade 27. When the aperture 1a is fully opened by the slit forming edge of the slit forming blade 27, the first driving member 8 for the first blade is such that after the locking portion 15c of the locking member 15 is temporarily pressed by the engaging portion 8a, the driving pin 8b is caused to abut on the shock absorbing member 2. By this abutment, the first driving member 8 for the first blade tends to bound, but the engaging portion 8a abuts on the locking portion 15c of the locking member 15 and the bound is prevented. As a result, the exposure operation on the first driving member 8 for the first blade, the second driving member 9 for the first blade, and the first blade group is completed, bringing about a state of FIG. 7. In FIG. 7, it is needless to say that the first blade group is arranged as shown in FIG. 2, while the second blade group is as in FIG. 6.

When predetermined time passes after the conduction of the coil of the electromagnet for the first blade is interrupted, as mentioned above, and the count of the electrical time in the exposure time control circuit is completed, the conduction of the coil of the electromagnet for the second blade is interrupted. Hence, timing where the conduction of the coil of the electromagnet for the second blade is interrupted varies with the photographing condition. In most cases, actually, it is common practice that before the exposure operation is completed, the conduction is interrupted and exposure is made continuously from the lower place to the upper place of the aperture through a slit provided by the slit forming blades 27 and 34. However, the operation of the embodiment is conveniently described with respect to the case where after the exposure operation of the first blade group is completed, as mentioned above, the conduction of the coil of the electromagnet for the second blade is interrupted.

In FIG. 7, when the conduction of the coil of the electromagnet for the second blade is interrupted, the retaining force of the iron piece member 19 by the iron core 7 is lost and the releasing member 17 for the second blade is rotated in a counterclockwise direction by the biasing force of the spring, not shown. The portion 14b to be pressed is pressed by the pressing portion 17a, and the locking member 14 is rotated in a counterclockwise direction against the biasing force of the spring, not shown, until it is stopped by the stopper, not shown. Since, in this case, the locking portion 14a of the locking member 14 is disengaged from the engaging portion 11a of the driving member 11 for the second blade, the driving member 11 for the second blade is rotated in a counterclockwise direction by the biasing force of the stiff driving spring for the second blade, not shown, against the biasing force of the spring 35.

As such, the arm 29 is rotated in a counterclockwise direction by the driving pin 11b of the driving member 11 for the second blade, from a state of FIG. 6, so that the four blades 31–34 of the second blade group are moved upward. By doing so, the amount of superposition of adjacent blades 31–34 is decreased, and the aperture 1a is closed by a slit forming edge which is the upper edge of the slit forming blade 34. After the four blades 31–34 is spread to fully cover the aperture 1a, the driving pin 11b of the driving member 11 for the second blade abuts on the shock absorbing member 3, and thereby the exposure operation on the driving member 11 for the second blade and the second blade group is completed. A state in this case is shown in FIG. 8.

When photographing is finished in this way, the control circuit is switched from the photographing mode to the observation mode. By rotating the cocking member 13 in a counterclockwise direction from the state of FIG. 8, the cocking operation of the shutter is performed. Specifically, when the circuit is switched to the observation mode as described above, the member, not shown, on the camera body side presses the portion 13c to be pressed of the cocking member 13 in association with this switch to rotate the cocking member 13 in a counterclockwise direction against the biasing force of the spring, not shown. Whereby, the pressing portion 13b of the cocking member 13 presses the roller 12 of the driving member 11 for the second blade to rotate the driving member 11 for the second blade in a clockwise direction against the biasing force of the driving spring for the second blade, not shown. Since the arm 29 is thus rotated in a clockwise direction by the driving pin 11b, the four blades 31–34 of the second blade group are moved downward, increasing the amount of superposition of adjacent blades, and the aperture 1a is opened by the slit forming edge of the slit forming blade 34.

Immediately after the cocking member 13 begins to rotate the driving member 11 for the second blade in this way, the roller 10 of the second driving member 9 for the first blade is pressed by the pressing portion 13a, and the second driving member 9 for the first blade is rotated in a clockwise direction against the biasing force of the driving spring for the first blade, not shown. In this case, the arm 23 of the first blade group is biased by the cocking spring 28 to rotate clockwise, and thus the first driving member 8 for the first blade, bringing the engaging portion 8a into contact with the pressing portion 9c of the second driving member 9 for the first blade, tends to rotate clockwise. However, the engaging portion 8a is locked by the locking portion 15c of the locking member 15, and the clockwise rotation of the member 8 is prevented immediately. Hence, the slit forming blade 27 of the first blade group will not be moved into the aperture 1a.

Figure 9:
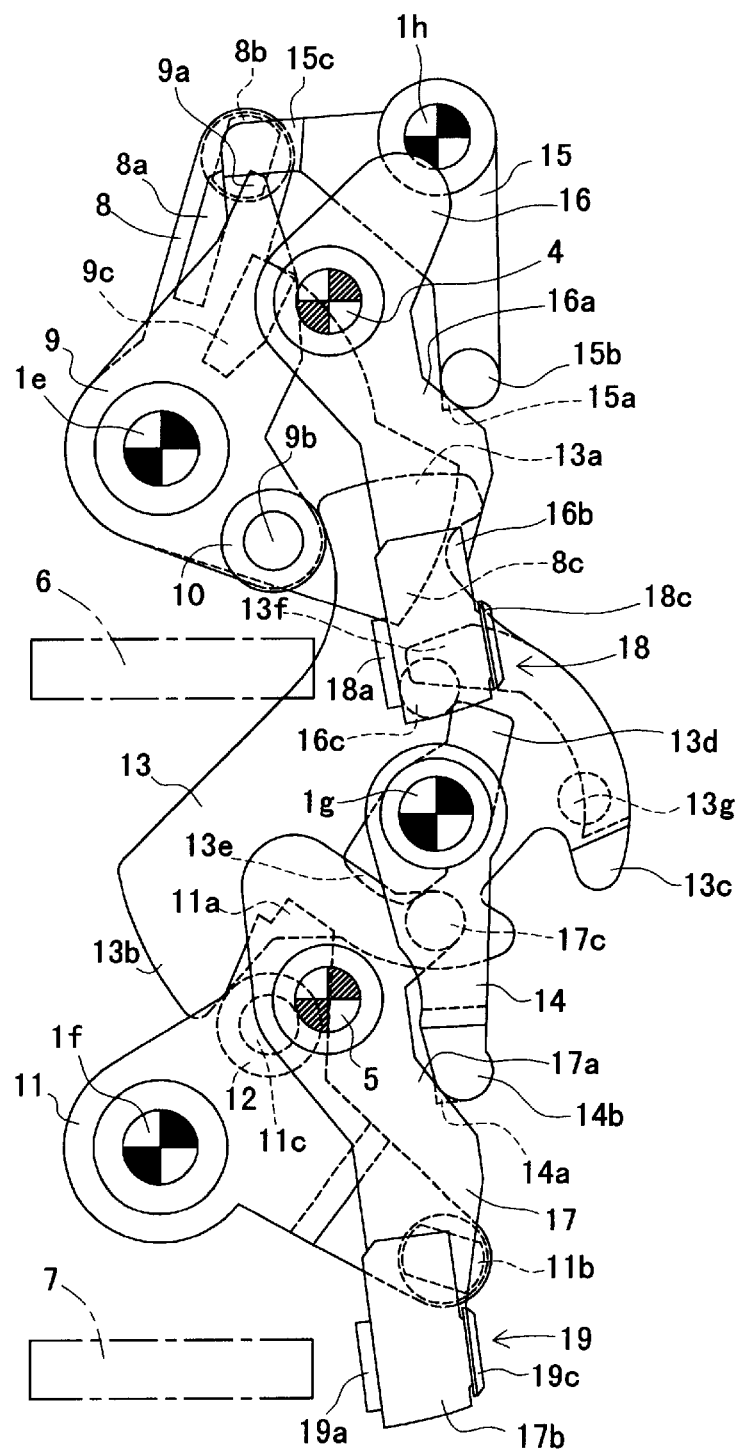
FIG. 9 is a plan view showing essential parts of the opening and closing drive mechanism of the embodiment in a state where a cocking operation is performed.
Figure 10:
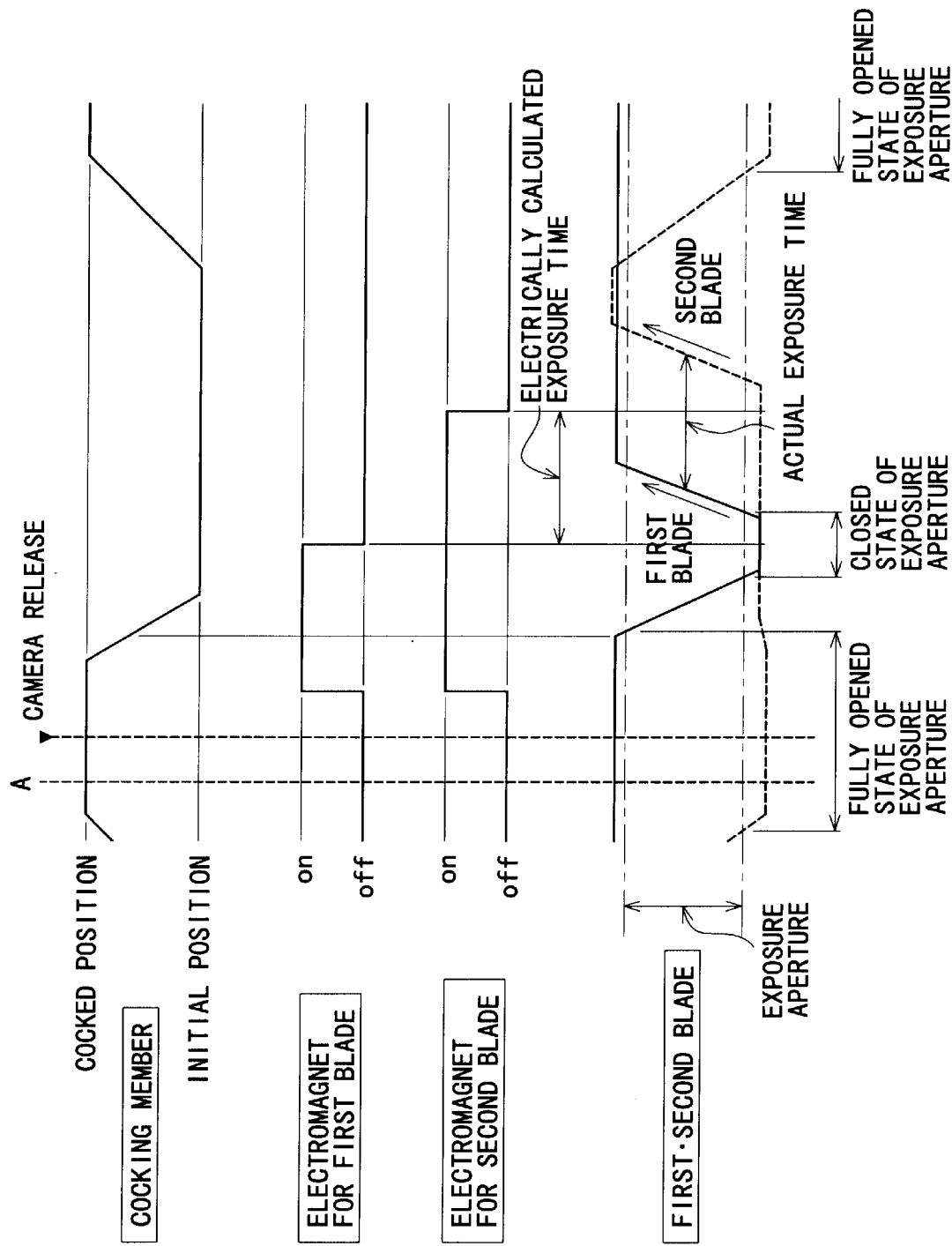
FIG. 10 is a timing chart for facilitating a comprehension of the embodiment.

After that, the pressing portion 13e of the cocking member 13 presses the portion 17c to be pressed of the releasing member 17 for the second blade and begins to rotate the releasing member 17 for the second blade in a clockwise direction against the biasing force of the spring, not shown. An instant state where the pressing portion 13d of the cocking member 13 comes into contact with the portion 16c to be pressed of the releasing member 16 for the first blade is shown in FIG. 9. When the cocking member 13 is further rotated in a counterclockwise direction from the state of FIG. 9, the two driving members 9 and 11 and the two releasing members 16 and 17 are rotated clockwise against the biasing forces of their respective springs, not shown, and the two locking members 14 and 15 are rotated clockwise against the biasing forces of the springs, not shown. In these processes, the locking portion 15c of the locking member 15 is disengaged from the engaging portion 8a of the first driving member 8 for the first blade.

Therefore, the first driving member 8 for the first blade tends to rotate clockwise due to the biasing force of the cocking spring 28 hooked on the arm 23, but the portion 8c to be held abuts on the holding portion 13f of the cocking member 13 and thus the rotation of the member 8 is stopped. The rotation is very slight, and hence in this case also, the slit forming blade 27 of the first blade group will not be moved into the aperture 1a. After that, the first blade group is not actuated, and only the second blade group continues to be actuated in accordance with the rotation of the cocking member 13.

On the other hand, the two releasing members 14 and 15 also continues to rotate clockwise due to the subsequent rotation of the cocking member 13. When the aperture 1a is fully opened, the iron piece portions 18a and 19a of the iron piece members 18 and 19 come into contact with the iron cores 6 and 7 of the electromagnets, respectively, almost simultaneously, and are pushed into the mounting portions 16b and 17b against the biasing forces of the compression springs 20 and 21 (see FIG. 8). When the iron piece portions 18a and 19a are slightly pushed, the rotation of the cocking member 13 is stopped and thereby a series of cocking operations is completed. The cocking member 13 is not restored immediately after the cocking operations are completed, and its position is maintained by the member, not shown, on the camera body side until the subsequent photographing is performed. This cocked state is shown in FIGS. 2 and 3.

The reason why the iron piece members 18 and 19 are constructed to be independent of the releasing members 16 and 17 through the compression springs 20 and 21, respectively, is that it is impossible for fabrication that the iron piece portions 18a and 19a are brought into contact with the iron cores 6 and 7, respectively, at the same time and the rotation of the cocking member 13 is stopped simultaneously with the contact. For mounting of the iron piece member, however, different structures from that of the embodiment are proposed, and the present invention is not limited to the mounting structure of the embodiment. In the embodiment, the cocking spring 28 is hooked on the arm 23 and is also used as a spring for adjusting the clearance of the pivotal portion. Where the spring 28 is not used as this adjusting spring, the shutter may be designed so that a cocking spring corresponding to the cocking spring 28 is hooked on the arm 22 or the first driving member 8 for the first blade and a conventional adjusting spring is hooked on the arm 23. When the spring is hooked on the first driving member 8 for the first blade, the shutter can be constructed so that if the spring is hooked between the first driving member 8 for the first blade and the second driving member 9 for the first blade and the exposure operation is performed, the biasing force of the cocking spring does not function as a load.

The embodiment mentioned above is such that the cocking member 13, when cocked, is actuated against the biasing force of the spring, not shown, by the member on the camera body side from the initial position shown in FIGS. 5 and 6, and an operation for restoring the member 13 to the initial position is performed by the biasing force of the spring. The present invention however, is not limited to such a construction, and operations from and to the initial position of the cocking member 13 may be performed in association with those of another member, without using the spring.

The embodiment is also designed so that at the initial stage of the cocking operation, the locking portion 15c of the locking member 15 locks the engaging portion 8a of the first driving member 8 for the first blade, and the lock of the locking portion 15c is released by the clockwise rotation of the locking member 15 when the releasing member 16 for the first blade is rotated in a clockwise direction. However, the shutter can also be constructed so that the driving member is not locked by the locking portion 15c. Specifically, as shown in FIG. 9, it is only necessary to design the shutter so that the holding portion 13f of the cocking member 13 is already moved in the operation range of the portion 8c to be held of the first driving member 8 for the first blade and the cocking member 13 blocks the clockwise rotation of the first driving member 8 for the first blade from the start. In this case, the clockwise rotation of the first driving member 8 for the first blade may somewhat increase so that a part of blades of the first blade group is moved into the aperture 1a. In such an instance, it is merely necessary to shape a part of the holding portion 13f into a cam form so that the first driving member 8 for the first blade is pushed back in accordance with the rotation of the cocking member 13. The locking member 15 for the first blade can be separated into two locking members, having the locking portion 15a and the locking portion 15c. Where the locking member 15 is separated in this way, the lock of the first driving member 8 for the first blade caused by the latter locking portion may be released in association with the cocking member 13, or may be released by another member, for example, the member on the camera body side.

Also, although the embodiment is constructed as the shutter of the locking type, the present invention can also be constructed as the shutter of the direct type. As an example of this case, the iron piece member 18 is mounted to the second driving member 9 for the first blade, while the iron piece member 19 is mounted to the driving member 11 for the second blade. By doing so, the two releasing members 16 and 17 and the two locking members 14 and 15 can be eliminated. In this case, the shutter, as mentioned above, may be constructed so that the rotation of the first driving member 8 for the first blade is blocked by only the holding portion 13f of the cocking member 13 from the start. When the locking member having only the locking portion 15c, described above, is provided, this is functionally and structurally advantageous.

In either the locking type in the embodiment or the direct type mentioned above, the shutter is such that the exposure time is electrically controlled. Hence, in either case, the first driving member for the first blade and the driving member for the second blade are retained at the exposure operation starting position and the electromagnets are contained in means for releasing this retention (retaining means) when the exposure operation is performed. The present invention, however, is also applicable to a shutter of a type that the retention is released by a mechanism for mechanically controlling the exposure time. Furthermore, from this, it is also possible to use the electromagnet in only the retaining means of the second blade system or to set the retaining means of the first blade system to the locking type and the retaining means of the second blade system to the direct type, when necessary.

What is claimed is:

1. A focal-plane shutter for digital still cameras, comprising:

a shutter base plate provided with an exposure aperture;

a first blade and a second blade for opening and closing said exposure aperture, each having a plurality of arms pivotally mounted on said shutter base plate and at least one blade component pivotally supported thereby;

a first driving member for said first blade, connected to said first blade and actuated so that said first blade closes said exposure aperture with a biasing force of a cocking spring immediately before an exposure operation is started;

a second driving member for said first blade, actuated by a biasing force of a driving spring for said first blade when said exposure operation is performed, and moving said first driving member for said first blade so that said first blade opens said exposure aperture against said biasing force of said cocking spring;

retaining means for said first blade, retaining said second driving member for said first blade at a position where said exposure operation is started and releasing a retention of said second driving member for said first blade when said exposure operation is performed;

a driving member for said second blade, connected to said second blade and moving said second blade so that said exposure aperture is closed by a biasing force of a driving spring for said second blade when said exposure operation is performed;

retaining means for said second blade, retaining the driving member for said second blade at a position where said exposure operation is started and releasing a retention of said driving member for said second blade when said exposure operation is performed; and a cocking member, moving said second driving member for said first blade and said driving member for said second blade against biasing forces of respective driving springs when moved from an initial position to a cocked position and preventing said biasing force of said cocking spring from moving said first driving member for said first blade to put said exposure aperture to a fully opened state so that when said first driving member for said first blade is restored to said initial position from said cocked position at an initial stage of subsequent photography, said first driving member for said first blade can be actuated by said biasing force of said cocking spring.

2. A focal-plane shutter for digital still cameras according to claim 1, wherein said retaining means for said first blade includes a locking member for said first blade for locking said second driving member for said first blade at the position where said exposure operation is started and a releasing member for said first blade, having an electromagnet for said first blade and an iron piece member for said first blade attracted by said electromagnet for said first blade and releasing a lock of said second driving member for said first blade by said locking member for said first blade when an attraction of said electromagnet for said first blade is released.

3. A focal-plane shutter for digital still cameras according to claim 2, wherein when said cocking member is actuated from said initial position to said cocked position, said locking member for said first blade temporarily locks said first driving member for said first blade until a state where an actuation of said first driving member for said first blade can be prevented, and a lock of said first driving member for said first blade is released in association with a subsequent operation of said cocking member.

4. A focal-plane shutter for digital still cameras according to any one of claims 1–3, wherein said retaining means for said second blade includes a locking member for said second blade for locking said driving member for said second blade at the position where said exposure operation is started and a releasing member for said second blade, having an electromagnet for said second blade and an iron piece member for said second blade attracted by said electromagnet for said second blade and releasing a lock of said driving member for said second blade by said locking member for said second blade when an attraction of said electromagnet for said second blade is released.

5. A focal-plane shutter for digital still cameras according to claim 1, wherein said retaining means for said first blade includes an electromagnet for said first blade and an iron piece member attached to said second driving member for said first blade, and said retaining means for said second blade includes an electromagnet for said second blade and an iron piece member for said second blade attached to said driving member for said second blade.

6. A focal-plane shutter for digital still cameras according to claim 5, wherein when said cocking member is actuated from said initial position to said cocked position, a locking member temporarily locking said first driving member for said first blade is provided until a state where an actuation of said first driving member for said first blade can be prevented, and a lock of said first driving member for said first blade is released in association with a subsequent actuation of said cocking member.

7. A focal plane-shutter for digital still cameras according to claim 4, wherein when said cocking member is restored to said initial position from said cocked position in a state where conduction of said electromagnet for said first blade and said electromagnet for said second blade is interrupted, only said second blade is actuated to close said exposure aperture, with said first blade held at a position where said exposure aperture is opened, and then when said cocking member is actuated from said initial position to said cocked position, said second blade is actuated to open said exposure aperture and, together with said first blade, opens said exposure aperture.

8. A focal plane-shutter for digital still cameras according to claim 6, wherein when said cocking member is restored to said initial position from said cocked position in a state where conduction of said electromagnet for said first blade and said electromagnet for said second blade is interrupted, only said second blade is actuated to close said exposure aperture, with said first blade held at a position where said exposure aperture is opened, and then when said cocking member is actuated from said initial position to said cocked position, said second blade is actuated to open said exposure aperture and, together with said first blade, opens said exposure aperture.

* * * * *